United States Patent

Mallams

[15] 3,669,952

[45] June 13, 1972

[54] 9-DIHYDROMEGALALOSAMINE AND ESTERS THEREOF AND METHODS FOR THEIR MANUFACTURE

[72] Inventor: Alan K. Mallams, West Orange, N.J.

[73] Assignee: Schering Corporation, Bloomfield, N.J.

[22] Filed: Oct. 13, 1969

[21] Appl. No.: 865,956

[52] U.S. Cl.....................260/210 AB, 424/180, 260/210 R
[51] Int. Cl.........................................C07c 47/18
[58] Field of Search.....................260/210 R, 210 E, 210 AB

[56] References Cited

UNITED STATES PATENTS 3,318,866   5/1967   Hoeksema.........................260/210 R
3,356,674   12/1967   Ikeda et al.........................260/209 R

OTHER PUBLICATIONS

Marquez et al., " The Journal of Antibiotics" Vol. XXII, No. 6, June, 1969, pp. 259– 263.

Primary Examiner—Lewis Gotts
Assistant Examiner—Johnnie R. Brown
Attorney—Stephen B. Coan and Mary S. King

[57] ABSTRACT

9-Dihydromegalalosamine and ester derivatives thereof and their pharmaceutically acceptable acid addition salts are novel macrolides exhibiting antibiotic activity.

9-Dihydromegalalosamine and ester derivatives thereof are prepared by treating megalalosamine and ester derivatives thereof with an alkali metal borohydride in an inert solvent. 9-Dihydromegalalosamine 2',4''-diacylates, 9-dihydromegalalosamine 3,9,2',4''-tetraacylates and 9-dihydromegalalosamine 3,9,12,2',4''-pentaacylates are prepared by treating 9-dihydromegalalosamine in a basic medium with an acylating reagent of a hydrocarbon carboxylic acid. 9-Dihydromegalalosamine 3,9-diacylates and 9-dihydromegalalosamine 3,9,12-triacylates are prepared by subjecting a 9-dihydromegalalosamine 3,9,2',4''-tetraacylate and a 9-dihydromegalalosamine 3,9,12,2',4''pentaacylate, respectively to mild hydrolysis.

7 Claims, No Drawings

9-DIHYDROMEGALALOSAMINE AND ESTERS THEREOF AND METHODS FOR THEIR MANUFACTURE

FIELD OF INVENTION

This invention relates to novel compositions of matter and to processes for their preparation.

More specifically, this invention relates to 9-dihydromegalalosamine and esters thereof and their pharmaceutically acceptable acid addition salts which exhibit antibiotic properties. My invention also relates to methods for the preparation of 9-dihydromegalalosamine and ester derivatives thereof and to intermediates produced thereby.

SUMMARY OF INVENTION

The invention sought to be patented in its composition of matter aspect resides in the concept of a chemical compound having a molecular structure comprising a 9-dihydroerythronolide nucleus to which an O-β-D-desosaminyl moiety is attached at C—5 and an O-β-D-rhodosaminyl moiety is attached at C—11, said compound being 9-dihydromegalalosamine, the chemical name of which is 5-O-(β-D-desosaminyl)-11-O-(β-D-rhodosaminyl)-9-dihydroerythronolide. Included in the composition of matter aspect of this invention are the 3-mono-, 2′,4′′-di-, 3,9-di-, 3,2′,4′′3,9,12-tri, 3,9,2′,4′′3,9,12,2′,4′′-pentaacylate esters of 9-dihydromegalalsoamine, as well as 3-tetrahydropyranyl-2′,4′′-diacylate esters of 9-dihydromegalalosamine, said esters including acylates of hydrocarbon carboxylic acids having up to 18 carbon atoms and hydrocarbon sulfonic acids having up to 7 carbon atoms. Also included in the composition of matter aspect of this invention are the pharmaceutically acceptable acid addition salts of 9-dihydromegalalosamine and the acylate esters thereof.

Generic chemical names of the 9-dihydromegalalosamine mono-, di-, tri-, tetra- and pentaacylates of this invention are 5-0-(β-D-desosaminyl)-11-O-(β-D-rhodosaminyl)-3-acyl-9-dihydroerythronolide, 5-O-(2′-O-acyl-β-D-desosaminyl)-11-(4′′-O-acyl-β-D-rhodosaminyl)-9-dihydroerythronolide, 5-O-(β-D-desos-aminyl)-11-O-(β-D-rhodosaminyl)-3,9-diacyl-9-dihydroerythronolide, 5-O-(2′-O-acyl-β-D-desosaminyl)-11-O-(4′′-O-acyl-β-D-rhodosaminyl)-3-acyl-9-dihydroerythronolide, 5-O-(β-D-desosaminyl)-11-O-(β-D-rhodosaminyl-3,9,12-triacyl-9-dihydroerythronolide, 5-O-(2′-O-acyl-β-D-desosaminyl)-11-O-(4′′-O-acyl-β-D-rhodosaminyl)-3,9-diacyltetraacyl-9-dihydroerythronolide, and 5-O-(2′-O-acyl-β-D-desosaminyl)-11-O-(4′′-O-acyl-β-D-rhodosaminyl)-3,9,12-triacyl-9-dihydroerythronolide, respectively. In this specification and in the claims, the ester derivatives are preferably named according to standard rules of nomenclature as acyl derivatives of 9-dihydromegalalosamine. For example, in the aforelisted chemical names of the esters of this invention, when "acyl" is "propionyl," the respective mono-, di-, tri-, tetra-, and pentatriester derivatives are named as 3-propionyl-9-dihydro-megalalosamine (9-dihydromegalalosamine 3-propionate), 2′,4′′-dipropionyl-9-dihydromegalalosamine (9-dihydromegalalosamine 2′,4′′-dipropionate), 3,9-dipropionyl-9-dihydromegalalosamine (9-dihydromegalalosamine 3,9-dipropionate), 3,2′,4′′-tripropionyl-9-dihydromegalalosamine (9-dihydromegalalosamine 3,2′,4′′3,9,12-tripropionyl-9-dihydromegalalosamine (9-dihydromegalalosamine 3,6(or 12),9-tripropionate),3,9,2′,4′′-tetrapropionyl-9-dihydromegalalosamine (9-dihydromegalalosamine 3,9,2′,4′′-tetrapropionate) and 3,9,12,2′,4′′-pentapropionyl-9-dihydromegalalosamine (9-dihydromegalalosamine 3,9,12,2′,4′′-pentapropionate), respectively.

The novel compositions of matter of this invention, i.e. 9-dihydromegalalosamine, esters thereof, and their pharmaceutically acceptable acid addition salts possess antibiotic activity and, specifically, exhibit activity against organisms producing bacterial, malarial, coccidial, fungal, and schistosomal infections. A preferred compound of this invention is 9-dihydromegalalosamine which possesses greatly enhanced antibiotic activity over that of megalalosamine from whence it is derived. Of the acylate esters of 9-dihydromegalalosamine, those wherein the acyl moieties have up to eight carbon atoms are preferred, particularly the 3-monoacyl-9-dihydromegalalosamines wherein the acyl has up to eight carbon atoms, which exhibit greater antibiotic activity than the poly- esters of my invention.

The invention sought to be patented in a process aspect of this invention resides in the concept of treating a member selected from the group consisting of megalalosamine, the 3-monoacyl-, 2′,4′′-diacyl-, 3,2′,4′′-triacyl-, and 3-tetrahydropyranyl-2′,4′′-diacyl derivatives thereof with an alkali metal borohydride in an inert solvent, whereby is prepared the corresponding 9-dihydro analog, i.e. a member selected from the group consisting of 9-dihydromegalalosamine, the 3-monoacyl-, 2′,4′′-diacyl-,3,2′,4′′3-tetrahydropyranyl-2′,4′′-diacyl derivatives thereof. Preferred species of this process is that wherein megalalosamine is the starting compound, the alkali metal borohydride is sodium borohydride, and the inert solvent is isopropanol, whereby is prepared 9-dihydromegalalosamine, a preferred compound of this invention.

The invention sought to be patented in another process aspect of my invention is that whereby the 2′,4′′-diacyl-9-dihydromegalalosamines (i.e. 9-dihydromegalalosamine 2′,4′′-diacylates) are prepared and resides in the concept of treating 9-dihydromegalalosamine in a basic medium at temperatures less than about 30° C with an acylating reagent selected from the group consisting of an acid anhydride and an acyl halide of a hydrocarbon carboxylic acid having up to 18 carbon atoms. Preferred modes of this process aspect are those wherein the basic medium is pyridine or wherein the basic medium is provided by an alkali metal bicarbonate in an inert solvent, e.g. sodium bicarbonate in acetone. In the latter case, the acylating reagent of choice is an acyl chloride or an acyl bromide of a hydrocarbon carboxylic acid having up to 18 carbon atoms.

The invention sought to be patented in a further process aspect of this invention is that whereby the 3,9,2′,4′′-tetraacylates and the 3,9,12,2′,4′′-pentaacylates of 9-dihydromegalalosamine are prepared and resides in the concept of treating a member selected from the group consisting of 9-dihydromegalalosamine, 3-acyl-9-dihydromegalalosamine and 2′,4′′-diacyl9-dihydromegalalosamine, and 3,9-diacyl-9-dihydromegalalosamine, and 3,2′,4′′-triacyl-9-dihydromegalalosamine, said acyl being derived from a hydrocarbon carboxylic acid having up to 18 carbon atoms in a basic medium with an acylating reagent selected from the group consisting of an acid anhydride and an acyl halide of a hydrocarbon carboxylic acid having up to 18 carbon atoms. As in the previous process aspect of this invention, preferred modes of this process are those wherein said basic medium is pyridine or wherein said basic medium is provided by an alkali metal bicarbonate in an inert solvent, e.g., sodium bicarbonate in acetone. In the latter case, the acylating reagent of choice is an acyl halide, particularly an acyl chloride and an acyl bromide, of a hydrocarbon carboxylic acid. In this process aspect, by utilizing as starting compound either a 3-monoacylate, a 2′,4′′-diacylate, or a 3,9-diacylate of 9-dihydromegalalosamine, there can be prepared mixed ester derivatives of my invention, i.e., 3,9,2′,4′′-tetraacyl-9-dihydromegalalosamines wherein the acyl group at C—3 and C—9 differs from the acyl group at C—2′ and at C—4′′.

The invention sought to be patented in another process aspect of this invention is that wherein the 3,9-diacyl- and the 3,9,12-triacyl-9-dihydromegalalosamines of this invention are prepared and resides in the concept of subjecting to mild hydrolysis a 3,9,2′,4′′3,9,12,2′,4′′-pentaacyl-9-dihydromegalalosamine, said acyl being derived from an acid selected from the group consisting of a hydrocarbon carboxylic acid having up to 18 carbon atoms. Preferred mild hydrolysis conditions comprise treating a 3,9,2',4''-tetraacyl-9-dihydromegalalosamine with an alcoholic-aqueous alkali metal carbonate solution (e.g. methanolic-aqueous potassium bicarbonate).

GENERAL DESCRIPTION OF THE INVENTION

Composition of Matter Aspect

Included among the physical embodiments of the composition of matter aspect of this invention as defined hereinabove are macrolides selected from the group consisting of 9-dihydromegalalosamine, ester derivatives thereof, and pharmaceutically acceptable acid addition salts of the foregoing, said macrolides being members selected from the group consisting of a compound having the following structural formula I:

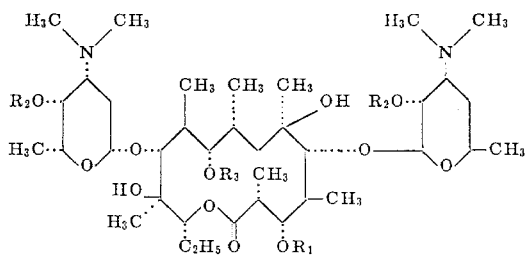

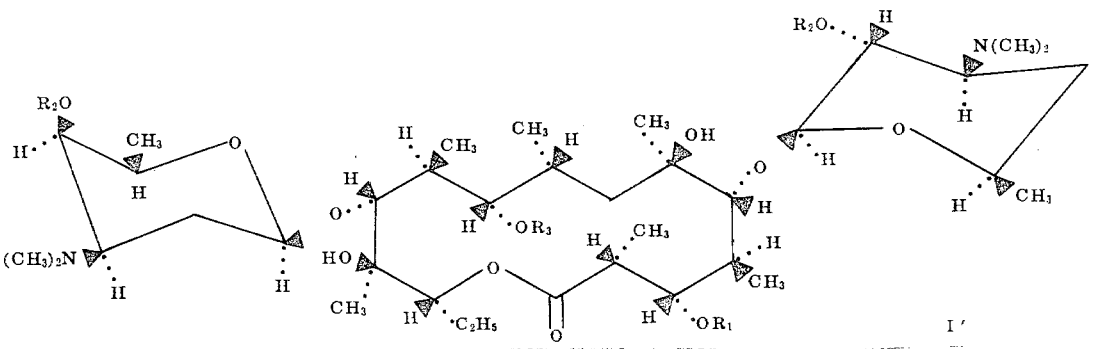

wherein $R_1$ is a member selected from the group consisting of hydrogen, tetrahydropyranyl, and an acyl radical of an acid selected from the group consisting of a hydrocarbon carboxylic acid having up to 18 carbon atoms and a hydrocarbon sulfonic acid having up to seven carbon atoms; $R_2$ and $R_3$ are each a member selected from the group consisting of hydrogen and an acyl radical of a hydrocarbon carboxylic acid having up to 18 carbon atoms; and when $R_1$ and $R_3$ are acyl radicals, a tertiary ester derivative of a compound of formula I consisting of a 12-hydrocarbon carboxylate having up to 18 carbon atoms; and the pharmaceutically acceptable salts thereof.

The acyl radicals are derived from hydrocarbon carboxylic acids containing up to 18 carbon atoms and may be saturated, unsaturated, straight chain or branched chain aliphatic, cyclic, cyclic-aliphatic, aromatic, aryl-aliphatic, or alkyl-aromatic, and may be substituted by hydroxy, alkoxy containing from one to five carbon atoms or by halogen such as fluorine, chlorine or bromine. Typical ester groups of the megalalosamine derivatives of this invention are thus derived from hydrocarbon carboxylic acids such as alkanoic acids, including formic, acetic, propionic, trimethylacetic, butyric, iso-butyric, ter.-butyric, valeric, iso-valeric, caproic, caprylic, undecylic, lauric, myristic, palmitic and steric acids; substituted alkanoic acids such as phenoxyacetic, trifluoroacetic, and β-chloropropionic acids; aromatic and substituted aromatic acids including benzoic, toluic, p-chlorobenzoic acids; aralkanoic acids such as phenylacetic and phenylpropionic acids; unsaturated acids such as acrylic, sorbic, and linolenic acids; and dibasic acids such as succinic, tartaric and phthalic acids. Also contemplated as included within the acyl radicals defined as $R_1$ and $R_2$ in compounds of structural formula I hereinabove are esters derived from hydrocarbon sulfonic acids having up to seven carbon atoms including methanesulfonic acid, benzenesulfonic acid, and p-toluenesulfonic acid.

The compound of formula I, wherein $R_1$, $R_2$, and $R_3$ are hydrogen, is 9-dihydromegalalosamine which also may be identified by the chemical name 5-(O-β-D-desosaminyl)-11-(O-β-D-rhodosaminyl)-9-dihydroerythronolide. The carbon atoms in the compounds of formula I are thus numbered in accordance with the conventional procedure used for macrolide derivatives, carbons one to 13 of the 9-dihydroerythronolide aglycone being as shown above in formula I, the carbon atoms in the desosamine moiety at C—5 and in the rhodosamine moiety at C—11 being given prime and double prime numbers as indicated above.

For convenience, the stereo configuration of 9-dihydromegalalosamine and esters thereof will be disclosed throughout the specification and claims in a planar fashion as set forth in formula I hereinabove, although the stereo configuration may also be depicted as shown below in formula I':

Also included within the composition of matter aspect of this invention are acyl ester derivatives of 9-dihydromegalalosamine as defined by formula I including 3-monoacyl-9-dihydromegalalosamines (compounds wherein $R_1$ is an acyl radical and $R_2$ and $R_3$ are hydrogen) such as 3-propionyl-9-dihydro-megalalosamine (also named as 9-dihydromegalalosamine 3-propionate) and 3-isovaleryl-9-dihydrogalalosamine; 2',4''-diacyl-9-dihydromegalalosamines (compounds wherein $R_1$ and $R_3$ are hydrogen and $R_2$ is an acyl radical) such as 2',4''-diacetyl-9-dihydromegalalosamine and 2',4''9-dihydromegalalosamine; 3,9-diacyl-9-dihydromegalalosamines (compounds wherein $R_1$ and $R_3$ are acyl and $R_2$ is hydrogen) such as 3,9-dipropionyl-9-dihydromegalalosamine; 3-tetrahydropyranyl-2',4''-diacyl-9-dihydromegalalosamines (compounds wherein $R_1$ is tetrahydropyranyl, $R_2$ is acyl and $R_3$ is hydrogen) such as 2',4''3-tetrahydropyranyl-9-dihydromegalalosamine; 3,2',4''-triacyl-9-dihydromegalalosamine (compounds wherein $R_1$ and $R_2$ may be the same or different acyl radicals and $R_3$ is hydrogen), such as 3,2',4''-triacetyl-9-dihydromegalalosamine, 3,2',4''-tripropionyl-9-dihydromegalalosamine, 3,2',4''-triisovaleryl-9-dihydromegalalosamine, 2',4''-diacetyl-3-propionyl-9- dihydromegalalosamine, 2',4''-diacetyl-3-isovaleryl-9-dihydromegalalosamine, 2',4''-dibenzoyl-3-caproyl-9-dihydromegalalosamine, 2',4''-diacetyl-3-methanesulfonyl-9-dihydromegalalosamine and 2',4''-dibenzoyl-3-methanesulfonyl-9-dihydromegalalosamine; 3,9,12-triacyl-9-dihydromegalalosamines (compounds wherein $R_1$ and $R_3$ are acyl, $R_2$ is hydrogen and one of the tertiary hydroxyl groups at C—6 or C—12 is esterified) such as 3,9,12-triacyl-tripropionyl-9-dihydromegalalosamine; 3,9,2',4''9-dihydromegalalosamine (compounds wherein $R_1$, $R_2$, and $R_3$ are acyl) such as 3,9,2',4''9-dihydromegalalosamine; and 3,9,12,2',4''-pentaacyl-9-dihydromegalalosamines (compounds wherein $R_1$, $R_2$ and $R_3$ are acyl and a tertiary hydroxyl at C—6 or at C—12 is also acylated) such as 3,9,12,2',4''-pentapropionyl-9-dihydromegalalosamine.

The physical embodiment of the compounds of this invention as defined by formula I, i.e., 9-dihydromegalalosamine, 3-acyl-9-dihydromegalalosamines, 2',4''-diacyl-9-dihydromegalalosamines, 3,9-diacyl-9-dihydromegalalosamines, 3,2',4''-triacyl-9-dihydromegalalosamines, 3,9,12-triacyl-9-dihydromegalalosamines, 3,9,2',4''9-dihydromegalalosamines and the 3,9,12,2',4''-pentaacyl-9-dihydromegalalosamines are characterized by being usually white crystalline solids (although some are white amorphous powders). My compounds are soluble in most polar organic solvents including halogenated hydrocarbons, e.g., chloroform and carbon tetrachloride, and nitrogen substituted hydrocarbons, e.g., pyridine and dimethylformamide, and in non-polar cyclic ethers, e.g., dioxane and tetrahydrofuran, and which are insoluble in water, and have a limited solubility in most non-polar organic solvents including hydrocarbons (e.g. benzene, hexane, and the like) and alkyl ethers (e.g. ethyl ether).

Included in the composition of matter aspect of this invention are pharmaceutically acceptable acid addition salts of 9-dihydromegalalosamine and esters thereof as defined by formula I which can be made, according to known procedures, by neutralizing the free base with the appropriate acid to below about pH 7.0 and, advantageously, to about pH 2 to pH 6. Suitable acids for this purpose are such as hydrochloric, sulfuric, phosphoric, thiocyanic, fluorosilic, hexafluoroarsenic, hexafluorophosphoric, acetic, succinic, citric, camphoric, glutaric, glycolic, phthalic, tartaric, lauric, stearic, salicylic, 3-phenylsalicylic, 5-phenylsalicylic, 3-cyclopentylpropionic, 1,2-cyclohexanedicarboxylic, 4-cyclohexane-carboxylic, octadecenylsuccinic, octenylsuccinic, dimethyldithiocarbamic, cyclohexylsulfamic, hexadecylsulfamic, octadecylsulfamic, sorbic, monochloroacetic, undecylenic, 4'-hydroxyazobenzene-4-sulfonic, octyldecylsulfuric, picric, benzoic, cinnamic and like acids.

The physical embodiments of the acid addition salts of 9-dihydromegalalosamine and esters thereof as defined by formula I are characterized by being white crystalline solids which are soluble in water and alcohols, e.g., methanol, ethanol, and the like, and are insoluble in most polar and nonpolar organic solvents.

The macrolide compounds of the composition aspect of my invention as defined by formula I, i.e., 9-dihydromegalalosamine, esters thereof, and the pharmaceutically acceptable acid addition salts thereof, exhibit a broad spectrum antibiotic activity in vitro against a variety of gram positive bacteria (e.g. staphylococcus aureus, staph. 11631, staph. W, streptococcus pyogenes C, strep. pyogenes C–203 and bacillus subtilis), gram negative bacteria (e.g. escherichia coli, salmonella schottmeulleri and pseudomonas aeruginosa). My compounds are thus useful to clean and sterilize laboratory glassware and surgical instruments, and may also be used in combination with soaps, detergents, and wash solutions for sanitation purposes as in the washing of hands, and in the cleaning and sanitizing of hospital rooms and areas used for food preparation such as kitchens, dining halls and the like.

The preferred species of the product aspect of my invention is 9-dihydromegalalosamine (compound of formula I wherein $R_1$, $R_2$ and $R_3$ are hydrogen) which has greatly enhanced antibiotic activity over that of megalalosamine from whence it is derived as illustrated below in Table I wherein is shown the in vitro antibacterial spectrum of 9-dihydromegalalosamine against typical gram-positive and gram-negative organisms with comparative data given for megalalosamine. The susceptibility of the test organisms to the antibiotics was determined by a tube dilution assay in yeast beef broth adjusted to pH 8.0 with sodium hydroxide.

TABLE I

| | Minimal inhibitory concentration (mcg./ml.) | |
|---|---|---|
| | Megalalosamine | 9-dihydromegalalosamine |
| +Staphylococcus aureus 209P | >25 | 0.8 |
| +Staphylococcus aureus W | >25 | 1.5 |
| +Streptococcus pyogenes C 203 | >25 | 3.0 |
| +Streptococcus pyogenes C | >25 | 3.0 |
| −Escherichia coli Sc 10536 | >25 | 3.0 |
| −Pseudomonas aeruginosa 8689 | | 17.5–>32 |

The antibacterial activity of 9-dihydromegalalosamine is also superior, in general, to that of the polyester derivatives of this invention, i.e., to that of the di-, tri-, tetra-, and pentaacyl derivatives of 9-dihydromegalalosamines. Of the 9-dihydromegalalosamine ester derivatives, the 3-monoacyl-9-dihydromegalalosamines (compounds of formula I wherein $R_1$ is acyl and $R_2$ and $R_3$ are hydrogen) e.g., 3-propionyl-megalalosamine, are preferred since they exhibit greater activity against gram positive and gram negative organisms than do the polyesters of this invention. Additionally, against certain organisms, the 3-monoacyl-9-dihydromegalalosamines exhibit greater activity than the parent hydroxy compound, i.e., 9-dihydromegalalosamine. For example, in the tube dilution assay test, the minimal inhibitory concentration of 3-propionyl-9-dihydromegalalosamine against Pseudomonas aeruginosa 8689 is much less than the minimal inhibitory concentration of 9-dihydromegalalosamine.

9-Dihydromegalalosamine (compound of formula I wherein $R_1 = R_2 = R_3 = H$), in addition to exhibiting superior antibacterial activity as shown in Table I, is useful also as an intermediate in the process aspects of this invention whereby are prepared the ester derivatives of 9-dihydromegalalosamine which also demonstrate antibiotic activity.

The 2',4''-diacyl-9-dihydromegalalosamine derivatives of my invention as exemplified by 2',4''-diacetyl-9-dihydromegalalosamine, while demonstrating antibacterial activity against both gram positive and gram negative organisms, are most useful as intermediates in preparing tetra- and penta-esters including mixed 3,9,2',4''2',4''-diacetyl-3,9-propionylmegalalosamine, and mixed 3,9,12,2',4'-pentaacylates, e.g., 2',4''-diacetyl-3,9,12-tripropionyl-9-dihydromegalalosamine by a process of this invention as described hereinbelow.

The 3,2',4''-triacylates, the 3,9,2',4''-tetraacylates and the 3,9,12,2',4''-pentaacylates of 9-dihydromegalalosamine which exhibit antibacterial activity are also valuable as intermediates in the preparation of the 3-monoacylates, 3,9-diacylates, and the 3,9,12-triacylates, respectively of this invention. Thus, for example, 3,2',4''-tripropionyl-9-dihydromegalalosamine, 3,9,2',4''9-dihydromegalalosamine, and 3,9,12,2',4''-pentapropionyl-9-dihydromegalalosamine when subjected to mild hydrolysis in aqueous methanol yield 3-propionyl-9-dihydromegalalosamine, 3,9-dipropionyl-9-dihydromegalalosamine, and 3,9,12-tripropionyl-9-dihydromegalalosamine, respectively, which exhibit antibacterial activity.

The acid addition salts of the composition of matter aspect of this invention, e.g., 9-dihydromegalalosamine ditartarate and the 9-dihydromegalalosamine dihydrochloride, can be used for the same biological purpose as the free bases as defined by formula I, e.g., 9-dihydromegalalosamine. Alternatively, the acid addition salts can be used as a means to further purify the free base megalalosamines by conversion thereof to an acid addition salt according to known techniques; then, after isolation and purification of the crystalline acid addition salt or solution thereof, regenerating the free base megalalosamine derivative by treatment with alkali.

First Process Aspect of the Invention

9-Dihydromegalalosamine (the compound of formula I wherein $R_1$, $R_2$, and $R_3$ are hydrogen), the 3-monoacyl-, 2',4''-diacyl-, 3,2',4''-triacyl-, and 3-tetrahydropyranyl-2',4''-diacyl derivatives thereof are prepared by the process aspect of this invention whereby a macrolide selected from the group consisting of megalalosamine and the 3-monoacyl-, 2',4''-diacyl-, 3,2',4''3-tetrahydropyranyl-2',4''-diacyl derivatives thereof is reduced by treatment with an alkali metal borohydride, preferably sodium borohydride, an inert solvent.

Inert solvents suitable for use in this process are those in which the alkali metal borohydride and the megalalosamine are most soluble and which also will minimize incidence of competing side reactions. When reducing megalalosamine and the 3-acyl derivatives thereof, e.g., 3-propionyl-megalalosamine, with sodium borohydride to obtain 9-dihydromegalalosamine and 3-propionyl-9-dihydromegalalosamine respectively, lower alkanols are usually used as solvent, the preferred solvent being isopropanol. When reducing the 2',4''-diacyl-, 3,2',4''-triacyl-, and the 3-tetrahydropyranyl-2',4''-diacyl-derivatives of megalalosamine with sodium borohydride to obtain the corresponding 9-dihydromegalalosamine, the solvents usually used are non polar cyclic ethers, e.g., tetrahydrofuran and preferably dioxane, to minimize the possibility of hydrolysis of the ester functions.

The process of reducing a member of the megalalosamine macrolide family with alkali metal borohydride in an inert solvent to produce a member of the 9-dihydromegalalosamine macrolide family is usually carried out at room temperature or at lower temperatures until reduction of the keto function at C—9 is completed (usually about 56 hours) as evidenced by thin layer chromatographic data of aliquots of the reaction mixture taken at intervals.

In a preferred species of the physical embodiment of this process, megalalosamine in isopropanol is reduced at 25° C with sodium borohydride for about 65 hours. The 9-dihydromegalalosamine product is conveniently isolated by adding water to the reaction mixture, acidifying the mixture to destroy the sodium borohydride complex intermediate, passing the 9-dihydromegalalosamine reaction mixture through an ion exchange column and concentrating the eluant. The 9-dihydromegalalosamine thereby isolated is conveniently purified via standard techniques such as chromatography on silica gel and crystallization.

When carrying out this reduction process in dioxane with a di- or tri-ester of megalalosamine as starting compound, the acidification of the reaction mixture after completion of the reaction is preferably carried only to about pH 4 to minimize hydrolysis of the ester functions.

The starting compounds of this process aspect, i.e., megalalosamine and the 3-acyl-, 2',4''-diacyl-, 3,2',4''-triacyl-, and the 3-tetrahydropyranyl-2',4''-diacyl derivatives thereof, are prepared according to procedures described and claimed in my copending application Ser. No. 865,957 filed concurrently herewith, for MEGALALOSAMINE AND ESTERS THEREOF AND METHODS FOR THEIR MANUFACTURE. Specifically, megalalosamine (the precursor for 9-dihydromegalalosamine, the preferred compound of this invention) is prepared by hydrolyzing a known macrolide selected from the group consisting of megalomicin A, megalomicin B, megalomicin $C_1$, megalomicin $C_2$, or mixtures thereof in an aqueous acidic medium. The megalomicin starting compounds are known in the art and are prepared according to known procedures by the cultivation under submerged aerobic conditions of *Micromonospora megalomicea* var. *megalomicea* NRRL 3274 and *Micromonospora megalomicea* var. *nigra* NRRL 3275 of the order Actinomycetales.

The starting megalalosamines of my invention are defined by the following structural formula II:

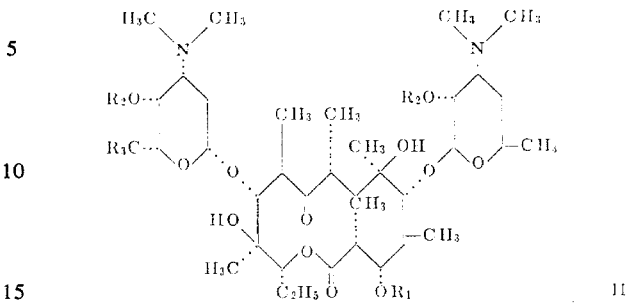

wherein $R_1$ is a member selected from the group consisting of hydrogen, tetrahydropyranyl, and an acyl radical of a hydrocarbon carboxylic acid having up to 18 carbon atoms and a hydrocarbon sulfonic acid having up to seven carbon atoms; and $R_2$ is a member selected from the group consisting of hydrogen and an acyl radical of an acid selected from the group consisting of a hydrocarbon carboxylic acid having up to 18 carbon atoms and a hydrocarbon sulfonic acid having about 7 carbon atoms. Typical starting compounds defined by formula II hereinabove are megalalosamine ($R_1 = R_2 = H$); 3-monoacyl esters such as 3-acetylmegalalosamine ($R_1$ is acetyl, $R_2$ is H); 3-propionylmegalalosamine ($R_1$ is propionyl, $R_2$ is H); 3-caproylmegalalosamine, and 3-stearoyl-megalalosamine; 2',4''-diacyl esters such as 2',4''-diacetyl-megalalosamine ($R_1$ is H, $R_2$ is acetyl) and 2',4''-dibenzoyl-megalalosamine; and 3,2',4''-trisubstituted esters such as 3,2',4''$_1$ $R_2$ acetyl), 3,2',4'' -tripropionylmegalalosamine, 3,2',4''-tri-isovaleryl-megalalosamine, 2',4''-diacetyl-3-isovalerylmegalalosamine, 2',4''3-methanesulfonylmegalalosamine, 2',4''-dibenzoyl-3-methane-sulfonylmegalalosamine, 2',4''-dibenzoyl-3-tetrahydropyranyl-megalalosamine, and 2',4''-dibenzoyl-3-caproylmegalalosamine.

2',4''-Diacyl Process Aspect of the Invention

The 2',4''-diacyl-9-dihydromegalalosamines of formula I wherein $R_1$ and $R_3$ are H and $R_2$ is acyl are prepared by the process aspect of this invention whereby 9-dihydromegalalosamine is esterified at temperatures less than about 30° C. in a basic medium with an acylating reagent selected from the group consisting of an acid anhydride and an acyl halide derived from an acid selected from the group consisting of a hydrocarbon carboxylic acid having up to 18 carbon atoms.

The necessary acylating reagents for this process, i.e., acid anhydrides and acyl halides of hydrocarbon carboxylic acids having up to 18 carbon atoms are known compounds and may be prepared utilizing procedures known in the art. Of the acyl halides, those usually employed are the more readily available acyl chlorides and acyl bromides of hydrocarbon carboxylic acids having up to 18 carbon atoms and hydrocarbon sulfonic acids having up to seven carbon atoms.

Among the basic media contemplated as suitable for use in this process are tertiary aliphatic and aromatic amines including cyclic amines having a boiling point in the range of from about 70° C to about 115° C, e.g., triethylamine and, preferably, pyridine, which serve both as solvent and basic agent. Also suitable as basic media for this process are alkali metal bicarbonates (preferably sodium bicarbonate) and alkali metal carbonates (e.g. sodium carbonates) in the solid state suspended in a non-hydroxylated solvent inert to the acylating reagent, e.g., dioxane, tetrahydropyran and, preferably, acetone. Of the foregoing, pyridine is the basic medium of choice when the acylating reagent is an acid anhydride, e.g., acetic anhydride, propionic anhydride, isovaleric anhydride, and sodium bicarbonate in acetone is the basic medium of choice when the acylating reagent is an acyl halide, preferably an acyl chloride or an acyl bromide, such as benzoyl chloride, caproyl chloride and stearoyl chloride. In general, any acid anhydride, acyl chloride or acyl bromide of a hydrocarbon carboxylic acid having up to 18 carbon atoms may be used in this process aspect of my invention, and there will be obtained the 2',4''-diacyl esters of formula I.

A convenient method of carrying out the physical embodiment of a preferred species of this process, i.e., that which utilizes an acid anhydride in pyridine as the basic acylating medium, comprises preparing a solution of 9-dihydromegalalosamine in dry pyridine to which has been added an acid anhydride, e.g., acetic anhydride, in amounts greater than two moles anhydride per mole of megalalosamine, and allowing this solution to stand at room temperature (about 25° C) overnight (usually about 16 hours). The 2',4''-diacyl-9-dihydromegalalosamine, e.g., 2',4''9-dihydromegalalosamine, is then conveniently isolated as substantially the sole product and purified utilizing techniques known in the art such as solvent extraction, precipitation, crystallization, chromatography and the like. I have found, even when using large excesses of acid anhydride per mole of megalalosamine, that by carrying out the esterification reaction at low temperatures, e.g., below 30° C, the reaction virtually stops after the more reactive 2'- and 4''-hydroxyl groups are esterified, and there are obtained good yields of 2',4''-diacyl-9-dihydromegalalosamine of good purity.

Similarly, a convenient method of carrying out the physical embodiment of another preferred species of this process aspect, i.e., that which utilizes an acyl halide of a hydrocarbon carboxylic acid (e.g. benzoyl chloride) as the acylating agent and an alkali metal bicarbonate (e.g. sodium bicarbonate) in an inert solvent (e.g. acetone), as the basic medium, comprises preparing a solution of 9-dihydromegalalosamine in acetone to which has been added solid sodium bicarbonate, and then adding an acyl halide, e.g., benzoyl chloride, in amounts in excess of two moles of acid halide per mole of 9-dihydromegalalosamine and the reaction mixture stirred at room temperature overnight (about 16 hours) and there is formed good yields of 2',4''-dibenzoyl-9-dihydromegalalosamine, of good purity which is easily isolated by filtering the reaction mixture, adding ammonium hydroxide to the acetone solution, and filtering the resulting white solid, a 2',4''-diester which can be further purified utilizing known techniques, e.g., column chromatography followed by crystallization of the eluate residue.

3,9,2',4''-Tetraacyl Process Aspect of the Invention

The 3,9,2',4''9-dihydromegalalosamines and the 3,9,12,2',4'-pentaacyl-9-dihydromegalalosamines of formula I wherein $R_1$, $R_2$, and $R_3$ are acyl radicals are prepared by this process aspect which resides in the concept of treating a member selected from the group consisting of 9-dihydromegalalosamine, 3-acyl-9-dihydromegalalosamine, and 2',4''-diacyl-9-dihydromegalalosamine, 3,9-diacyl-9-dihydromegalalosamine, and 3,2',4''-triacyl-9-dihydromegalalosamine, said acyl being derived from an acid selected from the group consisting of a hydrocarbon carboxylic acid having up to 18 carbon atoms and when at C—3, a hydrocarbon sulfonic acid having up to seven carbon atoms, in a basic medium with an acylating reagent selected from the group consisting of an acid anhydride and an acyl halide of a hydrocarbon carboxylic acid.

The requisite starting compounds for this process, i.e., 9-dihydromegalalosamine, 3-acyl-9-dihydromegalalosamine, 2',4''9-dihydromegalalosamine, 3,9-diacyl-9-dihydromegalalosamine, and 3,2',4''-triacyl-9-dihydromegalalosamine, are prepared by processes described and claimed herein.

The acylating reagents and the basic mediums contemplated as suitable for this process aspect are the same as those described hereinabove for the 2',4''-diacyl process aspect. Preferred species for carrying out this process are those wherein the esterification is carried out in pyridine utilizing as acylating reagent either an acid anhydride of a hydrocarbon carboxylic acid or an acyl halide of a hydrocarbon sulfonic acid, as well as those wherein esterification is carried out in an inert solvent, e.g., acetone, in the presence of an alkali metal bicarbonate, e.g., sodium bicarbonate, utilizing as acylating reagent an acyl halide of acids selected from the group consisting of hydrocarbon carboxylic acids and of hydrocarbon sulfonic acids.

The particular reaction conditions employed in this process aspect can vary depending upon the starting compound, acylating reagent, and basic medium employed. When utilizing 9-dihydromegalalosamine as starting compound, a preferred method of carrying out the physical embodiment of this process is to heat a solution of megalalosamine in pyridine with a large molar excess of an acid anhydride (e.g. acetic anhydride, propionic anhydride, and isovaleric anhydride) at elevated temperatures in the range of from about 70° to about 115° C overnight (usually about 16 hours) and there is formed excellent yields of 3,9,2',4''-tetraacylmegalalosamine (e.g., 3,9,2'.4''-tetraacetyl-9-dihydromegalalosamine, 3,9,2',4''-tetrapropionyl-9-dihydromegalalosamine, and 3,2',4''-tetra-isovaleryl-9-dihydromegalalosamine) which is isolated utilizing conventional techniques such as by solvent extraction precipitation, and chromatographic techniques. When carrying out this mode of my process, in general, the higher the temperature employed, the faster is the rate of reaction when this process is carried out at the higher temperatures, i.e., from about 100° to 115° C, particularly for long periods of time, in addition to forming the tetraacyl derivatives of my invention, there is also formed a pentaacyl derivative the fifth ester function being either at C—6 or at C—12. Thus, when 9-dihydromegalalosamine is treated with propionic acid anhydride in pyridine at 80° C for 16 hours there is formed a product of predominantly 3,9,2',4''9-dihydromegalalosamine together with some of the penta ester. When this reaction is carried out at 115° C, the major product isolated is 3,9,12,2',4''-pentapropionyl-9-dihydromegalalosamine. While 3,9,2',4''9-dihydromegalalosamine forms at temperatures below 70° C, the rate of reaction is exceedingly slow since, even though the 3,9,2'-and 4''-hydroxyl groups are all secondary hydroxyl groups, the 2',4''-diacyl-9-dihydromegalalosamine derivatives form first, even at lower temperatures, and, unless forcing conditions are employed, such as by utilizing heat, the more hindered 3- and 9-hydroxyl functions will be esterified at an extremely slow rate.

When utilizing a 2',4''-diacyl-9-dihydromegalalosamine (e.g. diacetyl-9-dihydromegalalosamine or dibenzoyl-9-dihydromegalalosamine) as starting compound to prepare a mixed ester derivative of this invention, and, specifically, when introducing a hydrocarbon carboxylic acid ester at C—3 and C—9 such as the propionate, or caproate, both preferred modes of this process are conveniently employed. Thus, for example, when a solution of diacetyl-9-dihydromegalalosamine in pyridine to which is added more than a two molar excess of propionic anhydride, is heated at about 80° C overnight (around 16 hours) according to my process, there is formed 2',4''-diacetyl-3,9-dipropionyl-9-dihydromegalalosamine.

Alternatively, when n-caproylchloride is added to a mixture of dibenzoyl-9-dihydromegalalosamine and solid sodium bicarbonate in acetone and the mixture is heated under reflux on a steam bath, there is obtained 2',4''-dibenzoyl-3,9-dicaproyl-9-dihydromegalalosamine. When carrying out modes of this process aspect wherein the rate of reaction is slow, the progress of the reaction is followed via thin layer chromatography of aliquots of reaction mixture to determine when the 2',4''-diester starting compound is no longer present.

When it is desired to introduce a 3-hydrocarbonsulfonyl group (e.g. methanesulfonyl) into a 2',4''-diacyl-9-dihydromegalalosamine (e.g. 2',4''-diacetyl-9-dihydromegalalosamine) via this process, pyridine is conveniently used as solvent and a hydrocarbonsulfonyl chloride (e.g. methanesulfonyl chloride) as acylating reagent, and the reaction may be carried out at room temperature, although higher temperatures may be used if shorter reaction times are desired. Thus, when 2',4''-diacetyl-9-dihydromegalalosamine in pyridine to which methanesulfonyl chloride has been added in greater than a two molar excess, is allowed to stand at room temperature, there is obtained 2',4''-diacetyl-3,9-dimethanesulfonyl-9-dihydromegalalosamine.

When utilizing a 3-monoacylmegalalosamine (e.g. 3-propionyl-9-dihydromegalalosamine) as starting compound in this process, the 2',4''-diacyl groups (e.g. 2,4''-diacetyl) may be introduced under reaction conditions similar to those described in the 2',4''-diacyl process aspect of my invention, i.e., at room temperature utilizing either an acid anhydride in pyridine, or an acid halide in acetone in the presence of solid sodium bicarbonate. Thus, for example, when 3-propionyl-9-dihydromegalalosamine in pyridine to which has been added at least a 3-molar excess of acetic anhydride is left at room temperature for 16 hours, there is obtained 2',4''-diacetyl-3-propionyl-9-dihydromegalalosamine. If higher temperatures are employed, i.e., in the range of from 70° to about 115° C, there are obtained the tetra- and penta-propionate esters, e.g., 3,9,2',4''9-dihydromegalalosamine, and 3,9,12,2',4'-pentapropionyl-9-dihydromegalalosamine, respectively.

3,9-Diacyl and 3,9,12-Triacyl Process Aspect of the Invention

This process aspect of my invention provides a method for preparing the 3,9-di- and the 3,9,12-triesters of my invention, i.e., the 3,9-diacyl- and the 3,9,12-triacyl-9-dihydromegalalosamines of formula I wherein $R_1$ and $R_3$ are acyl and $R_2$ is hydrogen, which comprises subjecting a 3,9,2',4''9-dihydromegalalosamine or a tertiary ester derivative thereof (i.e. a pentaacyl-9-dihydromegalalosamine) to mild hydrolysis whereby the ester functions at C-2' and at C-4'' (which are less hindered and more reactive than the ester group at C—3) are hydrolyzed and there is formed a 3,9-diacyl- or a 3,9,12-triacyl-9-dihydromegalalosamine of this invention, respectively.

Contemplated as included within the term mild hydrolysis are reactions utilizing as hydrolyzing agents alcohols alone, e.g., methanol and ethanol, alcohols in the presence of an acid catalyst, e.g., p-toluenesulfonic acid, or aqueous alcoholic solutions. Additionally, aqueous alcoholic solutions containing basic compounds such as sodium carbonate, sodium bicarbonate, and ammonia may be employed as well as acidic solutions containing inorganic and organic acids such as hydrochloric acid, sulfuric acid, phosphoric acid, acetic acid, formic acid, and the like.

The particular reaction conditions to be employed for each hydrolysis will vary depending upon the tetra ester and penta ester starting compounds utilized and the hydrolysis reagent employed.

A convenient method of carrying out the physical embodiment of this process is to heat the 3,9,2',4''9-dihydromegalalosamine (e.g. 3,9,2',4''9-dihydromegalalosamine or the 3,9,12,2',4''-9-dihydromegalalosamine (e.g. 3,9,12,2',4''-pentapropionyl-9-dihydromegalalosamine in a methanolic-aqueous solution of potassium bicarbonate at reflux temperature for about 24 hours. Upon isolation of the hydrolysis product thereby formed utilizing known techniques such as solvent extraction and chromatographic techniques, there is isolated the 3,9-diacyl-9-dihydromegalalosamine (e.g. 3,9-dipropionyl-9-dihydromegalalosamine) and the 3,9,12-triacyl-9-dihydromegalalosamine (e.g. 3,9,12-tripropionyl-9-dihydromegalalosamine, respectively). To ensure minimum occurrence of hydrolysis at C—3 and at C—9, aliquots of the reaction solution are monitored at intervals via thin layer chromatography and the reaction stopped when the chromatogram indicates that all the tetra ester or penta ester has been consumed.

By the process aspect of this invention there may also be prepared 3-monoacyl-9-dihydromegalalosamine by subjecting 3,2'4''-triacyl-9-dihydromegalalosamines to mild hydrolysis. Thus, for example, by allowing a solution of 3,2' ,4''-tripropionyl-9-dihydromegalalosamine in an aqueous-methanolic solution of potassium bicarbonate at about 25° C for 65 hours, there is formed 3-propionyl-9-dihydromegalalosamine a preferred ester derivative of this invention.

It is apparent that the 9-dihydromegalalosamine derivatives of this invention may be prepared via a number of alternative routes. Thus, 3-propionyl-9-dihydromegalalosamine, which may be prepared as described in the previous paragraph, may also be prepared via the first process aspect of this invention, i.e., by reducing 3-propionylmegalalosamine with sodium borohydride in isopropanol.

The following examples are given by way of illustration and are not to be construed as limitations of this invention, the scope of which is indicated by the appended claims.

EXAMPLE 1

9-Dihydromegalalosamine

Stir a solution of 1 gm. of megalalosamine and 0.5 gm. of sodium borohydride in 50 ml. of isopropanol at 25° C for 65 hours. Add water to the reaction mixture then distill off the isopropanol and add hydrochloric acid until the pH of the solution is 1.0. Allow the reaction mixture to remain at 25° C for 30 minutes then pass the reaction mixture through an Amberlite I.R. 45 ion exchance column. Evaporate the eluant to a residue and chromatograph the residue on silica gel eluting with 40 percent methanol in chloroform. Evaporate the combined eluates to a residue comprising 0.57 gm. of 9-dihydromegalalosamine. Purify by crystallization from acetone/ether/hexane to give 9-dihydromegalalosamine as colorless crystals, m.p. 118°–128°C; $C_{37}H_{70}N_2O_{12}$; m/e 734 [M+]; $[\alpha]_D^{26}$ −31.5° (MeOH); pKa 8.9; I.R. $\nu_{max}$ (CHCl$_3$) 3440, 2790, 1725, 1170 cm.$^{-1}$; nmr: $\delta$ (CDCl$_3$) 2.28, 2.33 ppm.

EXAMPLE 2

3-Propionyl-9-dihydromegalalosamine

Stir a solution of 162 mg. of 3-propionylmegalalosamine and 82 mg. of sodium borohydride in 8 ml. of isopropanol at 25° C for 24 hours. Dilute the reaction mixture with water, distill off the isopropanol, and acidity the reaction mixture to a pH of about 1.0 with hydrochloric acid. Allow the acidified reaction mixture to remain at 25° C for 30 minutes then pass the reaction mixture through an Amberlite I.R. 45 ion exchange column. Evaporate the eluant to a residue and chromatograph the residue on silica gel eluting with 30 percent methanol in chloroform. Evaporate the eluates to a residue comprising 7.6 mg. of 3-propionyl-9-dihydromegalalosamine as a colorless amorphous solid; $C_{40}H_{74}N_2O_{13}$; m/e 790 [M+].

In a manner similar to that described above, treat each of the following 3-acylmegalalosamines with sodium borohydride in isopropanol:
3-isovalerylmegalalosamine,
3-caproylmegalalosamine,
3-stearoylmegalalosamine.

Isolate and purify the resultant respective products in a manner similar to that described above to obtain, respectively
3-isovaleryl-9-dihydromegalalosamine,
3-caproyl-9-dihydromegalalosamine,
3-stearoyl-9-dihydromegalalosamine.

EXAMPLE 3

2',4''-Diacetyl-3-propionyl-9-dihydromegalalosamine

Stir a solution of 1 gm. of 2',4''-diacetyl-3-propionylmegalalosamine and 0.5 gm. of sodium borohydride in 20 ml. of dioxane at 25° C for 65 hours. Dilute the reaction mixture with water and distill off the dioxane. Bring the solution to about pH 4 with hydrochloric acid then allow the solution to remain at 25° C for 30 minutes. Pass the reaction mixture through an Amberlite I.R. 45 ion exchange column. Evaporate the eluant to a residue and chromatograph the residue on silica gel eluting with 20 percent methanol in chloroform.

Evaporate the eluant to a residue comprising 2',4'''-diacetyl-3-propionyl-9-dihydromegalalosamine.

In a manner similar to that described hereinabove, treat each of the following 2',4''-diacyl- and 3,2',4''-triacyl-megalalosamines with sodium borohydride in dioxane:
2',4''-diacetylmegalalosamine,
2',4''-dibenzoylmegalalosamine,
3,2',4''-triacetylmegalalosamine,
3,2',4''-tripropionylmegalalosamine,
3,2',4''-triisovalerylmegalalosamine,
2',4''-diacetyl-3-isovalerylmegalalosamine,
2',4''-diacetyl-3-methanesulfonylmegalalosamine,
2',4''-dibenzoyl-3-methanesulfonylmegalalosamine,
2',4''-dibenzoyl-3-tetrahydropyranylmegalalosamine,
2',4''-dibenzoyl-3-caproylmegalalosamine.

Isolate and purify the resultant respective products in a manner similar to that described hereinabove to obtain respectively,
2',4''-diacetyl-9-dihydromegalalosamine,
2',4''-dibenzoyl-9-dihydromegalalosamine,
3,2',4''-triacetyl-9-dihydromegalalosamine,
3,2',4''-tripropionyl-9-dihydromegalalosamine,
3,2',4''-triisovaleryl-9-dihydromegalalosamine,
2',4''-diacetyl-3-isovaleryl-9-dihydromegalalosamine,
2',4''-diacetyl-3-methanesulfonyl-9-dihydromegalalosamine,
2',4''-dibenzoyl-3-methanesulfonyl-9-dihydromegalalosamine,
2',4''-dibenzoyl-3-tetrahydropyranyl-9-dihydromegalalosamine,
2',4''-dibenzoyl-3-caproyl-9-dihydromegalalosamine.

EXAMPLE 4

3,9,12,2',4''-Pentapropionyl-9-dihydromegalalosamine

To a solution of 3 gm. of 9-dihydromegalalosamine in 20 ml. of dry pyridine add 6 ml. of propionic anhydride and heat the reaction mixture at reflux temperature (about 115° C) on a steam bath for 16 hours. Cool the reaction mixture, add chloroform, and extract the chloroform solution with water. Dry the chloroform solution over magnesium sulfate, filter and evaporate the chloroform to a residue comprising 3,6(or 12),9,2'''-pentapropionyl-9-dihydromegalalosamine. Purify by preparative thin layer chromatography on silica gel (Kieselgel) plates eluting with 10 percent methanol in chloroform. Evaporate the combined eluates to give 1.65 gm. of 3,6(or 12),9,2'''-pentapropionylmegalalosamine. Purify further by recrystallization from acetone-hexane to yield colorless crystals of 3,9,12,2',4''-pentapropionyl-9-dihydromegalalosamine, m.p. 100°–103° C; $C_{52}H_{90}N_2O_{17}$; m/e 1014 [M+]; $\alpha_D^{26}$ −23.7° (EtOH); pKa 7.2; I.R.: $\nu_{max}$ (CCl$_4$) 3580, 2780, 1750, 1730, 1180 cm.$^{-1}$; nmr: δ (CDCl$_3$) 2.29, 2.51 ppm.

EXAMPLE 5

3,9,2',4''-Tetrapropionyl-9-dihydromegalalosamine

To a solution of 1 gm. of 9-dihydromegalalosamine in 7 ml. of dry pyridine add 2 ml. of propionic anhydride and heat the solution at about 80° C on a steam bath for 16 hours. Cool, add chloroform to the reaction mixture and wash the chloroform solution with water. Dry the chloroform solution over magnesium sulfate, filter and evaporate to a residue comprising 3,9,2',4'''9-dihydromegalalosamine in admixture with a small quantity of 3,9,12,2',4''-pentapropionyl-9-dihydromegalalosamine. Purify by preparative thin layer chromatography on silica gel plates eluting with 10 percent methanol in chloroform. Combine the like, more polar eluates and evaporate to a residue comprising 3,9,2',4''-tetrapropionyl-9-dihydromegalalosamine.

EXAMPLE 6

3,9,12-Tripropionyl-9-dihydromegalalosamine

Prepare a solution of 75 mg. of 3,9,12,2',4''-pentapropionyl-9-dihydromegalalosamine in 5 ml. of methanol in water (4:1). Heat the solution under reflux on a steam bath for 24 hours then evaporate to a residue comprising 3,9,12-tripropionyl-9-dihydromegalalosamine. Purify by chromatography on silica gel plates eluting with 10 percent methanol in chloroform to give 15 mg. of 3,9,12-tripropionyl-9-dihydromegalalosamine as a colorless amorphous solid; $C_{46}H_{82}NO_{15}$; m/e 902 [M+]; $\alpha_D^{26}$ −26.6° (EtOH); I.R.: $\nu_{max}$ (CCl$_4$) 3500, 2780, 1750, 1730, 1180, 1165 cm.$^{-1}$.

EXAMPLE 7

2',4''-Diacetyl-9-dihydromegalalosamine

To a solution of 2 gm. of 9-dihydromegalalosamine in 25 ml. dry pyridine add 5 ml. of acetic anhydride and allow the mixture to stand at about 25° C for 16 hours. Pour the reaction mixture into water, extract with chloroform, wash the combined chloroform extract with water then dry the combined chloroform extracts over magnesium sulfate, filter and evaporate to a residue comprising 2',4''-diacetyl-9-dihydromegalalosamine. Purify by chromatography on silica gel (Kieselgel) plates eluting with 25 percent methanol in chloroform. Evaporate the combined eluates to a residue comprising 0.35 gm. of 2',4''-diacetyl-9-dihydromegalalosamine. Purify further by crystallization from acetone-hexane, $C_{41}H_{74}N_2O_{14}$; $[\alpha]_C^{26}$ −19.4° (ethanol); I.R. δ max (CCl$_4$) 3470, 3320, 2780, 1750, 1730, 1235, 1170 cm.$^{-1}$; nmr: δ(CDCl$_3$) 2.01, 2.16, 2.27, 2.30 ppm.

EXAMPLE 8

3,9-Dipropionyl-9-dihydromegalalosamine

Prepare a solution of 1 gm. of 3,9,2',4''9-dihydromegalalosamine in 6 ml. of methanol-water (4:1) and heat the solution at reflux temperature on a steam bath for 24 hours. Evaporate the solution to s residue and purify the residue by chromatography on silica gel plates eluting with 10 percent methanol in chloroform. Evaporate the combined eluates to a residue comprising 3,9-dipropionyl-9-dihydromegalalosamine.

EXAMPLE 9

9-Dihydromegalalosamine dihydrochloride

To a solution of 10 mg. of 9-dihydromegalalosamine in 1.5 ml. of ether containing sufficient tetrahydrofuran to affect solution add dropwise a solution of dry hydrogen chloride in tetrahydrofuran until no further precipitate forms. Filter the resultant precipitate and wash with ether in tetrahydrofuran to give 9-dihydromegalalosamine dihydrochloride.

In similar manner, treat each of 3-propionyl-9-dihydromegalalosamine,
2',4''-diacetyl-9-dihydromegalalosamine,
3,9,12-tripropionyl-9-dihydromegalalosamine,
3,9,2',4''-tetrapropionyl-9-dihydromegalalosamine and
3,9,12,2',4''-pentapropionyl-9-dihydromegalalosamine
with dry hydrogen chloride in tetrahydrofuran. Isolate the product in a manner similar to that described to obtain, respectively
3-propionyl-9-dihydromegalalosamine dihydrochloride,
2',4''-diacetyl-9-dihydromegalalosamine dihydrochloride,
3,9,12-tripropionyl-9-dihydromegalalosamine dihydrochloride,
3,9,2',4''-tetrapropionyl-9-dihydromegalalosamine dihydrochloride, and
3,9,12,2',4''-pentapropionyl-9-dihydromegalalosamine dihydrochloride.

EXAMPLE 10

9-Dihydromegalalosamine ditartarate

To a solution of 10 mg. of 9-dihydromegalalosamine in 1.5 ml. of ether containing sufficient tetrahydrofuran to affect the solution, add dropwise a solution of tartaric acid in tetrahydrofuran until no further precipitate forms. Evaporate the solution to a residue and wash the resultant residue with ether-tetrahydrofuran (1:1) to give 9-dihydromegalalosamine ditartarate.

In similar manner treat each of
3-propionyl-9-dihydromegalalosamine,
2',4''-diacetyl-9-dihydromegalalosamine,
3,9,12-tripropionyl-9-dihydromegalalosamine,
3,9,2',4''-tetrapropionyl-9-dihydromegalalosamine and
3,9,12,2',4''-pentapropionyl-9-dihydromegalalosamine
with tartaric acid in tetrahydrofuran. Isolate the resultant products in a manner similar to that described to obtain respectively,
3-propionyl-9-dihydromegalalosamine ditartarate,
2',4''-diacetyl-9-dihydromegalalosamine ditartarate,
3,9,12-tripropionyl-9-dihydromegalalosamine ditartarate,
3,9,2',4''-tetrapropionyl-9-dihydromegalalosamine ditartarate, and
3,9,12,2',4''-pentapropionyl-9-dihydromegalalosamine ditartarate.

I claim:

1. A macrolide selected from the group consisting of 9-dihydromegalalosamine, ester derivatives thereof, and pharmaceutically acceptable acid addition salts of the foregoing, said macrolide being a member selected from the group consisting of a compound having the following structural formula I:

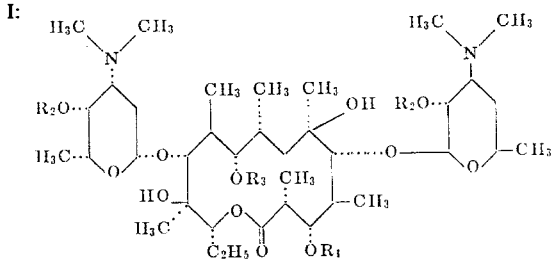

wherein $R_1$ is a member selected from the group consisting of hydrogen, tetrahydropyranyl, and an acyl radical of an acid selected from the group consisting of a hydrocarbon carboxylic acid having up to 18 carbon atoms and a hydrocarbon sulfonic acid having up to seven carbon atoms; and $R_2$ and $R_3$ are each a member selected from the group consisting of hydrogen and an acyl radical of a hydrocarbon carboxylic acid having up to 18 carbon atoms; and when $R_1$ and $R_3$ are acyl radicals, a hydrocarbon carboxylate having up to 18 carbon atoms may be present at C–12; and the pharmaceutically acceptable salts of the foregoing.

2. A compound according to claim 1 wherein $R_1$, $R_2$, and $R_3$ are hydrogen, said compound being 9-dihydromegalalosamine.

3. A compound according to claim 1 wherein $R_2$ and $R_3$ are hydrogen and $R_1$ is propionyl, said compound being 3-propionyl-9-dihydromegalalosamine.

4. A compound according to claim 1 wherein $R_1$ and $R_3$ are hydrogen and $R_2$ is acetyl, said compound being 2',4''-diacetyl-9-dihydromegalalosamine.

5. A compound according to claim 1 which is a tertiary propionate ester derivative of a compound of formula I wherein $R_1$ and $R_3$ are propionate and $R_2$ is hydrogen, said compound being 3,9,12-tripropionyl-9-dihydromegalalosamnie.

6. A compound according to claim 1 wherein $R_1$, $R_2$, and $R_3$ are propionyl, said compound being 3,9,2',4''-tetrapropionyl-9-dihydromegalalosamine.

7. A compound according to claim 1 which is a tertiary propionate ester derivative of a compound of formula I wherein $R_1$, $R_2$, and $R_3$ are propionyl, said compound being 3,9,12,2',4'-pentapropionyl-9-dihydromegalalosamine.

* * * * *

PO-1050
(5/69)

UNITED STATES PATENT OFFICE
CERTIFICATE OF CORRECTION

Patent No. 3,669,952                         Dated June 13, 1972

Inventor(s) Alan K. Mallams                                    -1-

It is certified that error appears in the above-identified patent
and that said Letters Patent are hereby corrected as shown below:

Column 1, line 26, " 3,2',4" 3,9,12-tri, 3,9,2',4" 3,9,12,2',
4"-" should read ---3,2',4"-tri-,3,9,12-tri-,3,9,2',4"-tetra- and
the 3,9,12,2',4"- ---; line 42, "(β-D-desos-aminyl)" should read---
(β-D-desosaminyl)--; line 63, "3,2',4" 3,9,12-tripropionyl-9-"
should read ---3,2',4"-tripropionate), 3,9,12-tripropionyl-9- ---;
lines 64 and 65, "3,6 (or 12), 9-tripropionate)" should read---
3,9,12-tripropionate---. Column 2, line 19, "3,2',4" 3-tetra-
hydropyranyl" should read---3,2',4"-triacyl-, and the 3-tetrahydro-
pyranyl- ---; line 47, "2',4"-diacyl9-" should read---2',4"-diacyl-
9- ---; line 72, "a 3,9,2',4" 3,9,12,2',4"-pentaacyl-" should
ead --a 3,9,2',4"-tetraacyl-or a 3,9,12,2',4"-pentaacyl---.

Columns 3 and 4, lines 35 to 52 in formula I', the left-hand portion
of formula I' reading," " should read --- 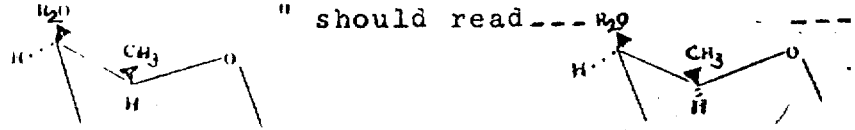

Column 4, line 63, "2',4"-9-dihydromegalalosamine;"should
read---2',4"-dibenzoyl-9-dihydromegalalosamine;---; line 69,
"2',4" 3-tetrahydropyranyl 9-" should read---2',4"-dibenzoyl-
3-tetrahydropyranyl-9- ---. Column 5, lines 8 and 9,"3,9,12-
triacyl-tripropionyl-9-dihydromegalalosamine; 3,9,2',4" 9-"
should read---3,9,12-tripropionyl-9-dihydromegalalosamine; 3,9,2',
4"-tetraacyl-9- ---; line 11, "such as 3,9,2',4" 9-" should read
--- such as 3,9,2',4"-tetrapropionyl-9- ---.

Page 2

PO-1050
(5/69)

UNITED STATES PATENT OFFICE
CERTIFICATE OF CORRECTION

Patent No. 3,669,952           Dated June 13, 1972

Inventor(s) Alan K. Mallams

It is certified that error appears in the above-identified patent and that said Letters Patent are hereby corrected as shown below:

Column 5, line 24, "3,9,2',4" 9-" should read ---3,9,2',4"-tetraacyl-9- ---. Column 6, lines 53 and 54, "3,9,2',4" 2",4"-diacetyl-3,9-propionylmegalalosamine" should read---3,9,2',4"-tetraacylates, e.g. 2',4"-diacetyl-3,9-propionylmegalalosamine---; line 55, "3,9,12,2',4'-" should read ---3,9,12,2',4"---; line 65, "3,9,2',4" 9-" should read ---3,9,2',4"-tetrapropionyl-9- ---. Column 7, line 16, "3,2',4" 3-tetrahydropyranyl-" should read---3,2',4"-triacyl-and 3-tetrahydropyranyl- ---. Column 8, lines 3 to 15 in structural formula II, the top left-hand portion of the formula reading, " 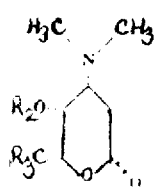 " should read --- 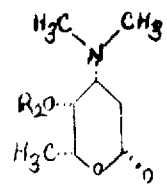 ---.

Column 8, line 33, "3,2',4" 1 R_2 acetyl) 3,2',4" " should read---3,2',4"-triacetylmegalalosamine (R_1=R_2=acetyl), 3,2',4"- ---; line 37, "2',4" 3-methanesulfonylmegalalosamine," should read---2',4"-diacetyl-3-methanesulfonylmegalalosamine- ---. Column 9, line 15, "2',4" 9-dihydromegalalosamine" should read ---2',4"-diacetyl-9-dihydromegalalosamine,---; line 49, "The 3,9,2',4" 9-" should read---The 3,9,2',4"-tetraacyl-9- ---; line 67, "2',4" 9-dihydromegalalosamine" should read---2',4"-diacyl-9-dihydromegalalosamine---. Column 10, line 33, "3,9,2',4" 9-" should read ---3,9,2',4"-tetrapropionyl-9- ---; line 37, "While 3,9,2',4" 9-" should read ---While 3,9,2',4"-tetraacyl-9- ---. Column 11, line 21, "3,9,2',4" 9-" should read---3,9,2',4"-tetrapropionyl-9-.---; line 31, "3,9,2',4" 9-" should read ---3,9,2',4"-tetraacyl-9- ---; lines 54 to 56, "3,9,2',4" 9-dihydromegalalosamine (e.g. 3,9,2',4" 9-dihydromegalalosamine or the 3,9,12,2',4"-9-" should read ---3,9,2',4"-tetraacyl-9-dihydromegalalosamine (e.g. 3,9,2',4"-tetrapropionyl-9-dihydromegalalosamine or the 3,9,12,2',4"-pentaacyl-9- ---; line 73, "-9-dihydromegalalosamine" should read----9-dihydromegalalosamines---.

Page 3

PO-1050
(5/69)

UNITED STATES PATENT OFFICE
CERTIFICATE OF CORRECTION

Patent No. 3,669,952      Dated June 13, 1972

Inventor(s) Alan K. Mallams

It is certified that error appears in the above-identified patent and that said Letters Patent are hereby corrected as shown below:

Column 12, line 43, "acidity" should read ---acidify---. Column 13, lines 43 and 44, "3,6 (or 12), 9,2'''-pentapropionyl-" should read---3,9,12,2',4"-pentapropionyl---; lines 47 and 48, "3,6(or 12), 9,2'''-pentapropionylmegalalosamine" should read---3,9,12,2',4"-pentapropionylmegalalosamine---; line 66,"3,9,2',4" 9-" should read---3,9,2',4"-tetrapropionyl-9- ---. Column 14, line 9,"$C_{46}H_{82}NO_{15}$" should read---$C_{46}H_{82}N_2O_{15}$---; line 28, "I.R.♂" should read---I.R.⊬ ---; line 35,"3,9,2',4" 9-" should read---3,9,2',4"-tetrapropionyl-9- ---; line 38,"to s residue" should read---to a residue---. Column 16, line 37 in claim 7, "3,9,12,2',4'-" should read---3,9,12,2',4"- ---.
Column 3, lines 17-30, Formula 1 should appear as follows:

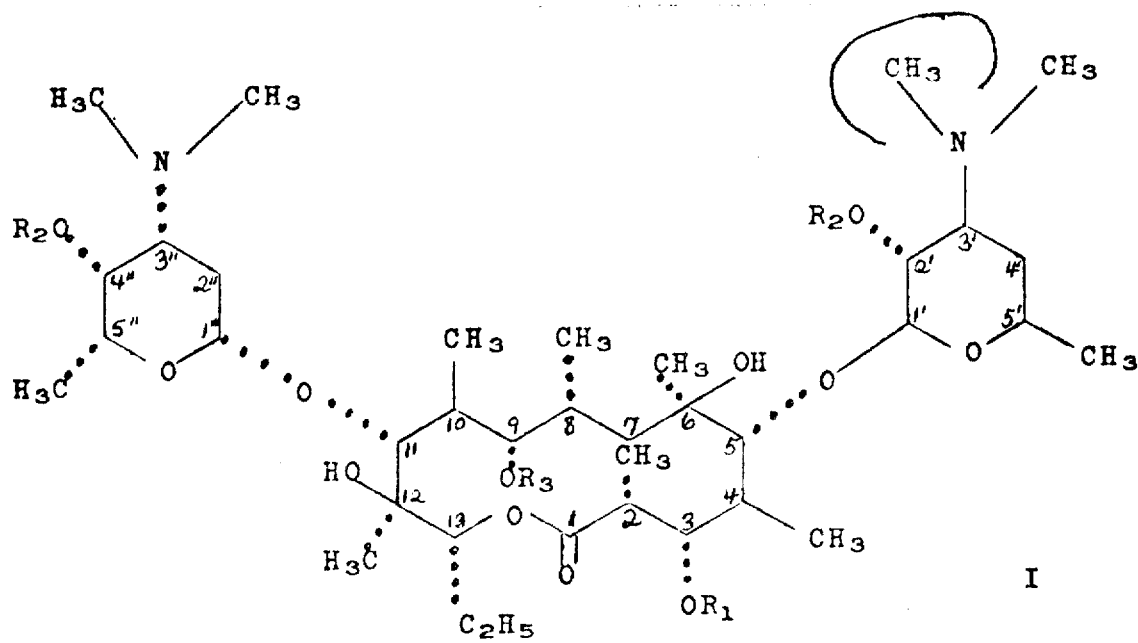

Signed and sealed this 27th day of November 1973.

(SEAL)
Attest:

EDWARD M.FLETCHER,JR.       RENE D. TEGTMEYER
Attesting Officer      Acting Commissioner of Patents